Aug. 16, 1966  E. T. GRABOSKI  3,266,300

APPARATUS FOR THE ULTRASONIC TESTING OF WHEELS

Filed Nov. 7, 1963  2 Sheets-Sheet 1

INVENTOR
EDWARD T. GRABOSKI
By Donald G. Dalton
Attorney

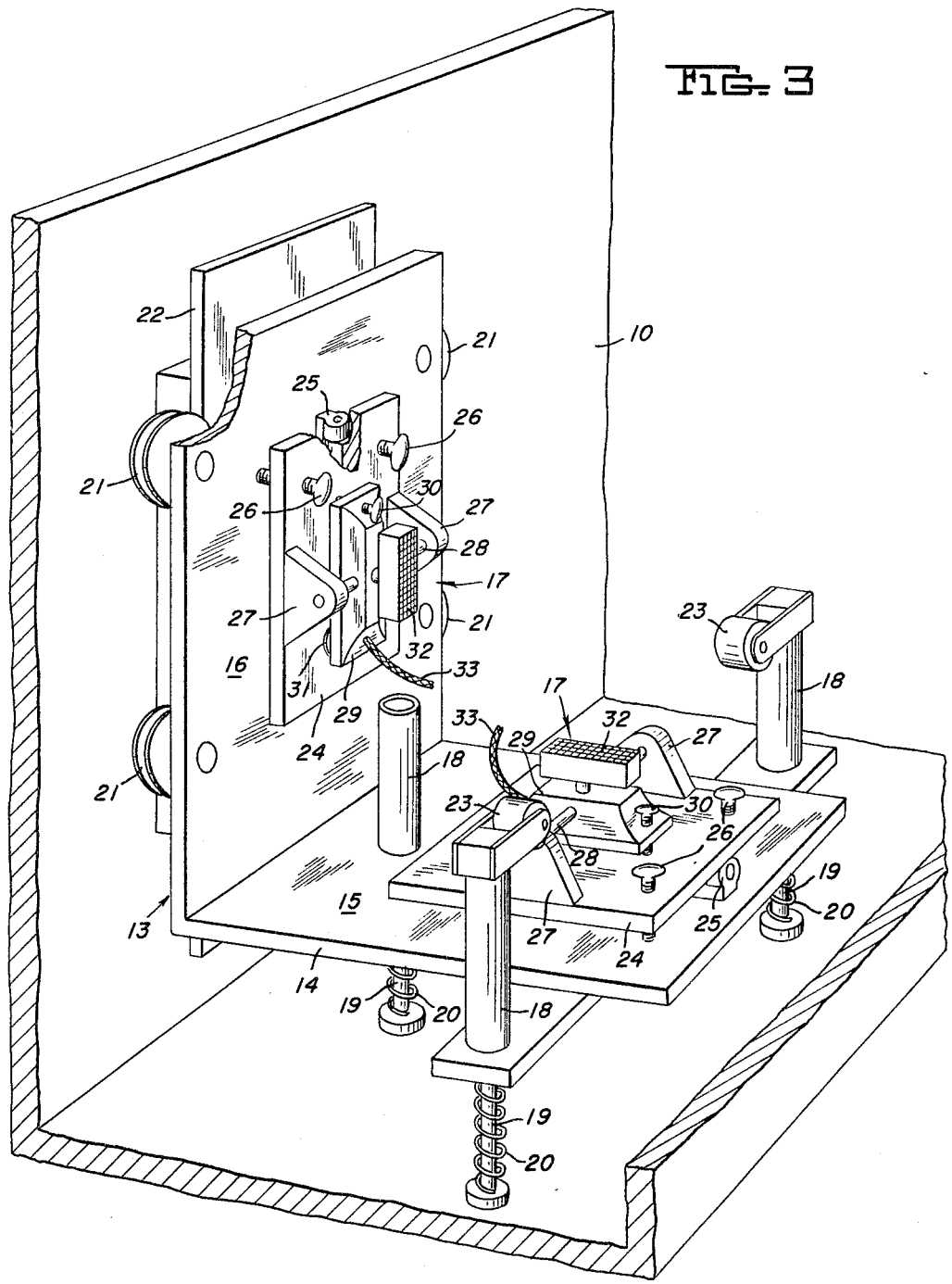

United States Patent Office 3,266,300
Patented August 16, 1966

3,266,300
APPARATUS FOR THE ULTRASONIC TESTING OF WHEELS
Edward T. Graboski, Penn Hills Township, Allegheny County, Pa., assignor to United States Steel Corporation, a corporation of Delaware
Filed Nov. 7, 1963, Ser. No. 322,227
3 Claims. (Cl. 73—71.5)

This invention relates to wheel-testing apparatus and, in particular, to apparatus for testing metal wheels ultrasonically to reveal the presence therein of hidden defects or discontinuities.

It is the object of my invention to improve on known ultrasonic wheel-testing apparatus particularly by providing a device which will indicate defects regardless of their orientation in the wheel. A further object is to provide apparatus for simultaneously introducing vibrations into the tread and one of the faces of the rim of a wheel, having means for automatically positioning it relative to the wheel rim.

In a preferred embodiment, my apparatus comprises a base plate resiliently supported in an immersion tank having spaced rollers to support a wheel for rotation in a vertical plane. The plate has a transducer mounted thereon for universal movement. Bearing rollers carried by the plate are adapted to be engaged by the wheel and are effective to position the transducer properly relative to the wheel when it is placed on the rollers in the tank. The base plate and its transducer mounting is duplicated, one assembly being disposed to introduce vibrations into the wheel tread and the other, at right angles to the first, to introduce vibrations into one face of the wheel rim.

A complete understanding of the invention may be obtained from the following detailed description and explanation which refer to the accompanying drawings illustrating the present preferred embodiment.

In the drawings:

FIGURE 3 is a perspective view with the tank broken away to expose the apparatus mounted therein.

Figure 1:
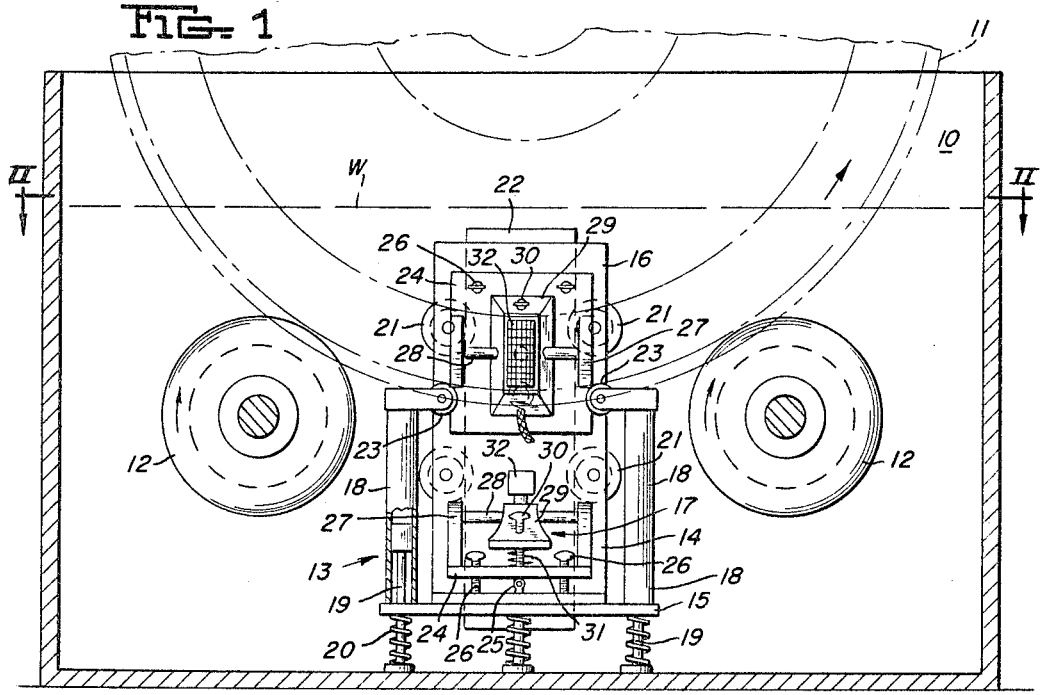
FIGURE 1 is a vertical section through the tank showing my apparatus in elevation.
Figure 2:
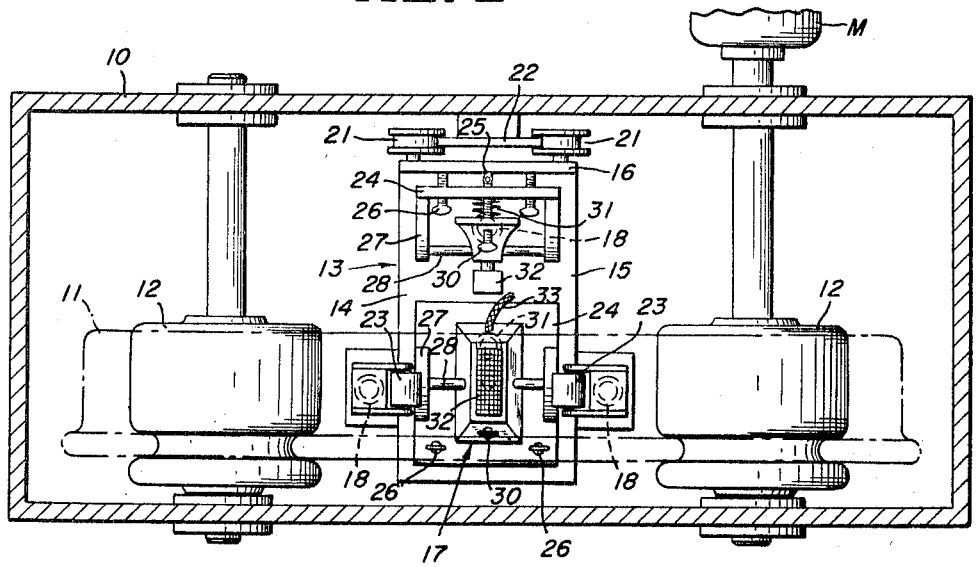
FIGURE 2 is a horizontal section through the tank along the plane of line II—II of FIGURE 1, showing the apparatus in plan.

Referring now in detail to the drawings, a tank 10 is adapted to contain a liquid such as water W for transmitting vibrations into the rim of a metal railroad-car wheel indicated in chain lines at 11. Grooved rollers 12 are journaled in tank 10 in any convenient manner to support wheel 11 for rotation with the lower segment of its rim immersed in the water. One of the rollers 12 is driven by any suitable means such as a motor M to rotate wheel 11.

My improved testing apparatus, indicated generally at 13, is mounted on a base plate 14 carried on the bottom and one side wall of tank 10. Plate 14 has horizontal and vertical portions 15 and 16 connected together along one edge forming a 90° dihedral angle therebetween. Each portion mounts a complete unit for ultrasonic testing indicated generally at 17. The two units are duplicates so a detailed description of one will suffice. The unit on base-plate portion 15, of course, is adapted to introduce vibrations radially into the tread of the wheel while the unit on base-plate portion 16 is adapted to introduce vibrations into one face of the rim, in a direction normal thereto.

Base-plate portion 15 has tubular posts 18 upstanding thereon in line with holes therethrough. Studs 19 placed vertically on the bottom of tank 10 extend upwardly into posts 18 and have compression springs 20 thereon which yieldably or resiliently support plate 14 as a whole for limited vertical movement. Base-plate portion 16 has grooved rollers 21 journaled thereon which cooperate with the edges of a guide plate 22 secured to the side wall of tank 10. Vertical movement of plate 14 is thus guided in a fixed path by the ways formed by the edges of plate 22. Two of the posts 18 mount bearing rollers 23 adapted to be engaged by the tread of wheel 11 as it is lowered onto rollers 12. Such engagement, of course, automatically positions plate 14 and the units 17 carried thereby, in proper relation to the wheel rim for ultrasonic testing by means now to be described.

Each base-plate portion 15 and 16 has an intermediate plate 24 pivotally mounted thereon by a hinge 25. Thumb screws 26 offset from the hinge and threaded through the plate permit the latter to be adjusted angularly to a limited extent. Bearing posts 27 at opposite sides of plate 24 journal a transverse shaft 28 on which is mounted a block 29. Block 29 may be angularly adjusted by a screw 30 at one end thereof. A compression spring 31 under the other end of the block maintains screw 30 in engagement with plate 24.

A transducer 32 is mounted on block 29 and connections therefrom are brought out in a cable 33. The transducer may be of any suitable type. One example is that made by Sperry Products Co., Danbury, Connecticut, designated Style No. 50K2384. It will be evident that the angular adjustability of plate 24 in two directions at right angles to each other affords universal movement of the transducer so it may be easily and accurately positioned at the optimum angle to the wheel surface.

In operation of the apparatus, it is only necessary to place wheel 11 on rollers 12, tank 10 being filled with water to the proper level, and operate motor M to drive one roller to effect a complete revolution of the wheel, after energizing the transducers 32 and a cathode-ray receiver to which they are connected, for indicating visually, the reflected vibrations caused by defects in the rim. Such a receiver is shown in Patent 2,280,226. It will be noted that the construction of the apparatus fixes the spacing of the transducers from the tread and side face respectively, of the rim of wheel 11. Wheels of different dimensions will require various spacings but, in any case, the construction is such that reflected vibrations picked up by the two transducers are not coincident on the receiver screen. Thus the testing of the rim in two directions may be carried out at the same time. A reflected vibration is therefore picked up by one or the other transducer, regardless of its orientation in the wheel rim.

Several advantages of my invention have already been mentioned. In addition, it is simple, inexpensive, easy to operate and requires little or no maintenance.

Although I have disclosed herein the preferred embodiment of my invention, I intend to cover as well any change or modification therein which may be made without departing from the spirit and scope of the invention.

I claim:

1. Apparatus for the ultrasonic testing of wheels including a tank, a pair of spaced rollers journaled horizontally in said tank and adapted between them to support a wheel rotatably in a generally vertical plane, the combination therewith of a generally horizontal base plate between said rollers, spring means constantly urging said plate toward the position of a wheel resting on said rollers, posts upstanding on said plate, rollers journaled on said posts adapted to engage said wheel and maintain a fixed spacing between it and said plate, said plate having a vertical extension, vertical ways in said tank, means on said extension engaging said ways to guide vertical movement of said plate, and a transducer mounted on said plate.

2. Apparatus as defined in claim 1, characterized by means mounting said transducer for universal movement on said plate.

3. Apparatus as defined in claim 1, characterized by studs upstanding on the bottom of said tank and extending through said plate into said posts, said spring means being helical compression springs on said studs.

References Cited by the Examiner

UNITED STATES PATENTS

| | | | |
|---|---|---|---|
| 2,940,305 | 6/1960 | Williams et al. | 73—67.8 |
| 3,056,286 | 10/1962 | Gibson et al. | 73—67.8 |
| 3,122,661 | 2/1964 | Joy | 73—67.8 |
| 3,148,535 | 9/1964 | Lemelson | 73—67.5 |

RICHARD C. QUEISSER, *Primary Examiner.*

L. R. FRANKLIN, *Assistant Examiner.*